(12) United States Patent
Pak

(10) Patent No.: US 7,472,863 B2
(45) Date of Patent: Jan. 6, 2009

(54) SKY HOPPER

(76) Inventor: Steve Pak, 28025 Ridgebrook Ct., Rancho Palos Verdes, CA (US) 90275

( * ) Notice: Subject to any disclaimer, the term of this patent is extended or adjusted under 35 U.S.C. 154(b) by 517 days.

(21) Appl. No.: 10/888,743

(22) Filed: Jul. 9, 2004

(65) Prior Publication Data

US 2006/0016930 A1  Jan. 26, 2006

(51) Int. Cl.
*B64C 29/00* (2006.01)
(52) U.S. Cl. .................. 244/12.5; 244/23 D; 244/52
(58) Field of Classification Search ............. 244/17.23, 244/17.25, 17.27, 23 A, 23 R, 12.5, 230, 244/12.1, 12.4, 15; 239/265.19, 265.25, 239/265.27
See application file for complete search history.

(56) References Cited

U.S. PATENT DOCUMENTS

| 2,651,480 | A | * | 9/1953 | Pullin | 244/17.23 |
|---|---|---|---|---|---|
| 3,073,548 | A | * | 1/1963 | Marsh | 244/12.5 |
| 3,181,810 | A | * | 5/1965 | Olson | 244/7 R |
| 3,265,142 | A | * | 8/1966 | Winter | 180/117 |
| 3,291,242 | A | * | 12/1966 | Tinajero | 180/116 |
| 3,360,217 | A | * | 12/1967 | Trotter | 244/12.4 |
| 3,591,109 | A | * | 7/1971 | McLarty | 244/17.23 |
| 4,071,207 | A | * | 1/1978 | Piasecki et al. | 244/23 D |
| 5,082,079 | A | * | 1/1992 | Lissaman et al. | 180/118 |
| 5,115,996 | A | * | 5/1992 | Moller | 244/12.5 |
| 5,505,407 | A | * | 4/1996 | chiappetta | 244/2 |
| 5,746,390 | A | * | 5/1998 | Chiappetta | 244/12.3 |
| 5,758,844 | A | * | 6/1998 | Cummings | 244/7 C |
| 5,823,468 | A | * | 10/1998 | Bothe | 244/2 |
| 5,842,667 | A | * | 12/1998 | Jones | 244/114 R |
| 5,860,620 | A | * | 1/1999 | Wainfan et al. | 244/12.1 |
| 6,030,177 | A | * | 2/2000 | Hager | 416/87 |
| 6,347,618 | B1 | * | 2/2002 | Klem | 123/561 |
| 6,467,724 | B2 | * | 10/2002 | Kuenkler | 244/17.25 |
| 6,568,630 | B2 | * | 5/2003 | Yoeli | 244/23 R |
| 6,719,244 | B1 | * | 4/2004 | Gress | 244/7 R |
| 6,808,140 | B2 | * | 10/2004 | Moller | 244/12.5 |
| 6,886,776 | B2 | * | 5/2005 | Wagner et al. | 244/12.4 |
| 6,892,980 | B2 | * | 5/2005 | Kawai | 244/12.4 |
| 7,044,422 | B2 | * | 5/2006 | Bostan | 244/7 B |
| 7,249,732 | B2 | * | 7/2007 | Sanders et al. | 244/23 A |
| 7,267,300 | B2 | * | 9/2007 | Heath et al. | 244/12.3 |
| 7,275,712 | B2 | * | 10/2007 | Yoeli | 244/23 A |
| 2003/0080242 | A1 | * | 5/2003 | Kawai | 244/12.4 |
| 2004/0026563 | A1 | * | 2/2004 | Moller | 244/12.4 |
| 2004/0093130 | A1 | * | 5/2004 | Osder et al. | 701/3 |
| 2004/0155143 | A1 | * | 8/2004 | Yoeli | 244/17.11 |
| 2005/0242231 | A1 | * | 11/2005 | Yoeli | 244/23 R |
| 2006/0049304 | A1 | * | 3/2006 | Sanders et al. | 244/23 A |
| 2006/0113426 | A1 | * | 6/2006 | Yoeli | 244/23 A |
| 2007/0034738 | A1 | * | 2/2007 | Sanders et al. | 244/23 A |

(Continued)

*Primary Examiner*—Bret Hayes
*Assistant Examiner*—Benjamin P Lee
(74) *Attorney, Agent, or Firm*—Daniel L. Dawes

(57) ABSTRACT

A vertical takeoff and landing (VTOL) aircraft design particularly suitable as a full-sized aircraft or remote controlled (RC) model aircraft is disclosed. The invention employs lightweight, high strength materials to reduce the power requirements of the propulsion plant. A preferred system of the invention comprises one internal combustion engine able to spit shaft power to four fan units. The fan units further employ counter rotating fan blades for stability. Separate horizontal and vertical tilting mechanisms delivered to the fan units are additionally disclosed. A variation in design is further included wherein electric motors provide the necessary shaft power.

15 Claims, 14 Drawing Sheets

U.S. PATENT DOCUMENTS

2007/0034739 A1 * 2/2007 Yoeli .......................... 244/23 R
2008/0054121 A1 * 3/2008 Yoeli .......................... 244/12.1
2008/0142643 A1 * 6/2008 Yoeli .......................... 244/23 R

* cited by examiner

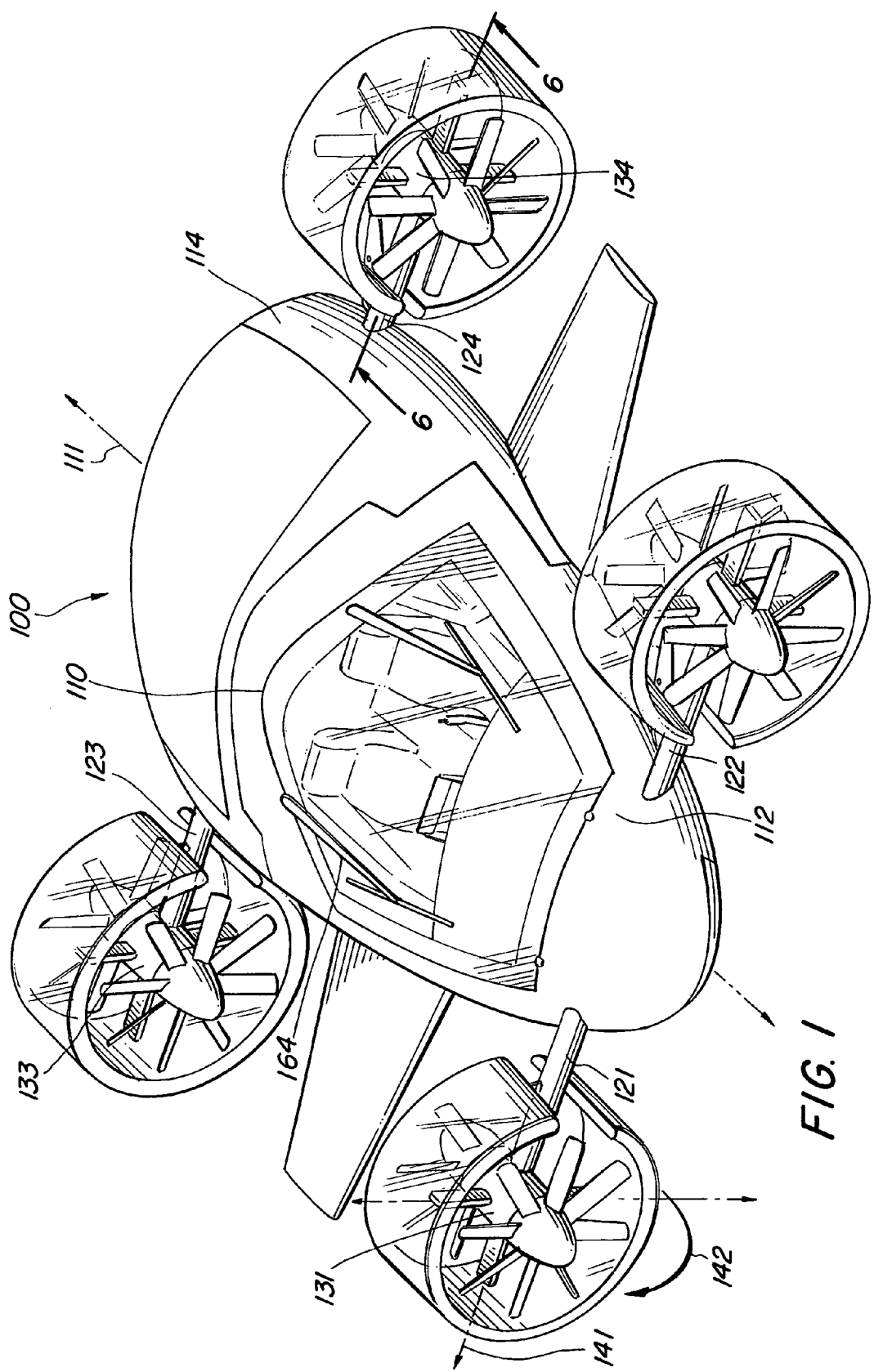

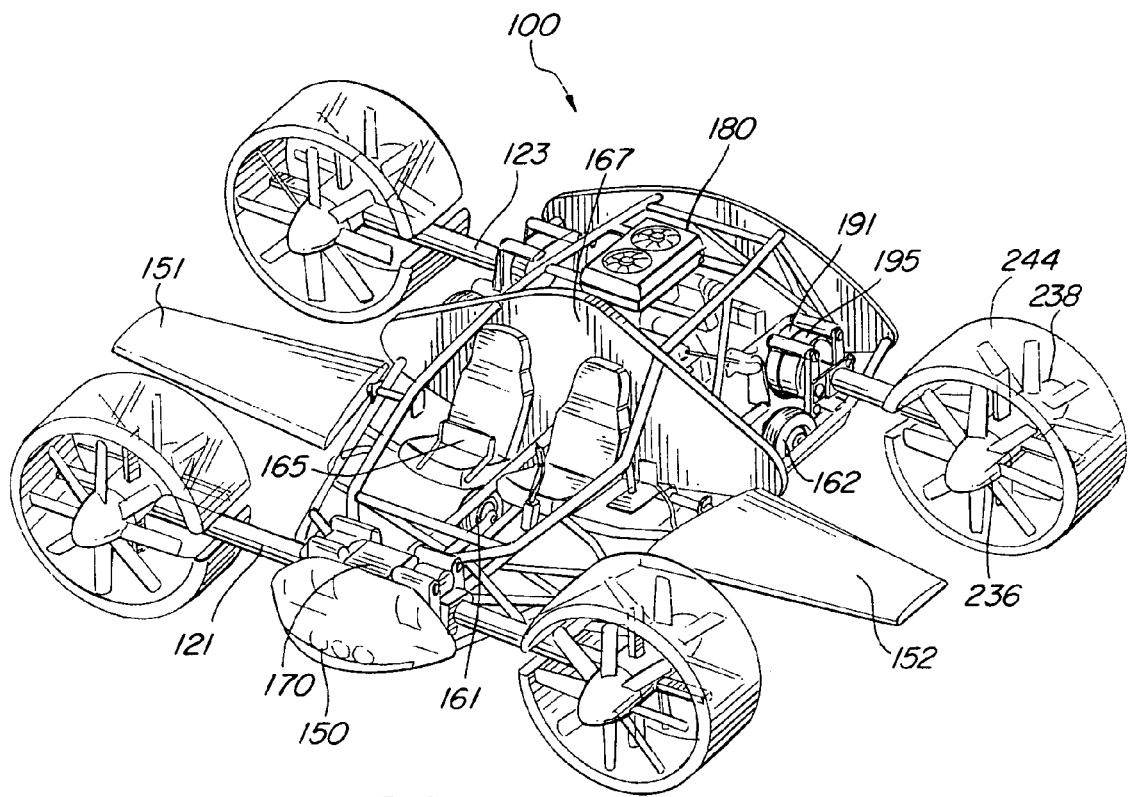
FIG. 2A
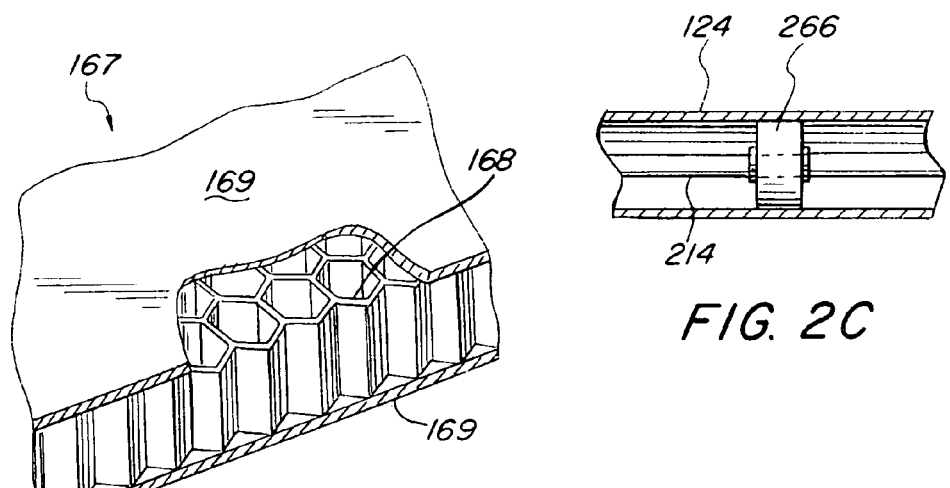
FIG. 2B
FIG. 2C

SKY HOPPER

BACKGROUND OF THE INVENTION

1. Field of the Invention

The present invention pertains generally to vertical takeoff and landing (VTOL) aircraft. More particularly, the present invention pertains to aircraft having tilting propulsion systems for vertical takeoff. The present invention is particularly, but not exclusively, useful as a VTOL aircraft design for relatively small remote control (RC) aircraft and larger passenger aircraft.

2. Description of the Prior Art

Vertical Takeoff and Landing (VTOL) aircraft are generally any of numerous unconventional designs for aircraft including rotary wing helicopters, having rotatable or divertible propulsion systems that allow for vertical takeoff/landing and horizontal flight. Advancements in technology have long been desired to produce a more commercially viable design for VTOL aircraft. Current methods of travel have numerous constraints, particularly conventional air travel that requires expensive airports having long runways and vast airspace. Especially, transportation between small and medium cities could benefit from major improvements in aircraft design and within large cites where automobiles and current aircraft have not met the needs of the public.

The helicopter as a VTOL aircraft was once envisioned for public use as providing safe and efficient travel unsuitable for current automobiles and typical runway aircraft. For many reasons, however, the helicopter has remained a limited-use, special-purpose aircraft. Principally, the large rotating lift blades of the helicopter design must meet very stringent mechanical requirements and require a very complicated system for drive and control. Another disadvantage of the helicopter is that the angular moment caused by the lift blades requires the use of a tail rotor rotating about a horizontal axis. Loss of the tail rotor is thus a potentially devastating casualty. Helicopters also employ pitch adjustable blades resulting in extremely expensive construction and maintenance costs and a high level of pilot proficiency in flying and controlling the aircraft.

Certain additional designs for vertical takeoff and landing (VTOL) aircraft and for vertical and short takeoff and landing (V/STOL) are well known. Some designs are modifications of fixed wing aircraft to include vertical propulsion while maintaining stability in vertical lift mode. U.S. Pat. No. 4,474,345 "Tandem Fan Series Flow VSTOL Propulsion System" by R. G. Musgrove discloses a propulsion system for V/STOL that includes a jet engine for normal wing borne flight modified with additional fans having a diverter to exhaust thrust directionally downward. While this design is capable of supersonic speeds, an aircraft of this system will be very heavy and require a relatively powerful vertical thrust. Similarly, a design proposed by Moller, U.S. Pat. No. 5,115,996 employs directional vectoring of thrust to provide vertical lift capability. This design will also yield a relatively heavy aircraft as it employs multiple engines with large horsepower requirements. Furthermore, mobility and maneuverability are concerns especially at lower air speeds and transitioning between hovering and normal flight mode.

Additional designs of VTOL aircraft are known in the art each having certain advantages and drawbacks. One such design is a tilt-rotor type that is also referred to a "convertible" type, having rotors, which are capable of being tilted with respect to the aircraft structure. For example, during takeoff, the rotors are orientated almost vertically so as to operate like a rotary wing, in order to allow vertical takeoff in the manner of a helicopter. Next, the aircraft flight is transitioned from vertical to horizontal mode, thus the rotors are tilted horizontally so as to operate like airscrews.

Among the tilt-rotor type VTOL aircrafts there are some that employ multiple large engines to provide the necessary thrust. These designs however will be relatively heavy and will not have a particularly attractive power-to-weight ratio. Also, in vertical flight mode, a large weight proportioned at a distance from the aircraft's center of gravity will cause a moment of inertia adversely affecting stability and mobility. Also known, are VTOL designs of model aircraft or miniature remote controlled (RC) aircraft. One such design is disclosed in U.S. Pat. No. 5,836,545 Toy Aircraft And Method for Remotely Controlling the Same by D. Dixon. In the model aircrafts, weight is relatively less of a concern and stability is of greater concern. In all designs, weight, stability and power-to-weight ratio of the propulsion system are chief design concerns.

Heretofore, existing technology in power systems and strength in lightweight materials have encumbered the realization of a commercially viable VTOL design. Particular advancements in these areas have lead to the present invention that provides a lightweight VTOL design particularly suitable for passenger aircraft or an RC model aircraft. The present invention additionally provides a VTOL design that is easy to manufacture, relatively simple to use, and comparatively cost effective.

BRIEF SUMMARY OF THE INVENTION

The present invention specifically addresses and alleviates the above mentioned deficiencies associated with the prior art. More particularly, the present invention comprises a vertical takeoff and landing (VTOL) aircraft comprising: an elongated fuselage having forward and after sections and defining a longitudinal axis, the forward and after sections each having left and right quarter sections; a first forward structure beam extending outward from the fuselage perpendicular to the longitudinal axis at the forward right quarter section; a second forward structure beam extending outward from the fuselage perpendicular to the longitudinal axis at the forward left quarter section; a first after structure beam extending outward from the fuselage perpendicular to the longitudinal axis at the after right quarter section; a second after structure beam extending outward from the fuselage perpendicular to the longitudinal axis at the after left quarter section; a first forward propulsion unit structurally connected to the first forward structure beam; a second forward propulsion unit structurally connected to the second forward structure beam; a first after propulsion unit structurally connected to the first forward structure beam; and a second after propulsion unit structurally connected to the second after structure beam; wherein each of the propulsion units are rotatable vertically about a horizontal axis, and wherein each of the propulsion units are shaft driven and wherein the first and second, forward and after structure beams each comprise a horizontal shaft.

The vertical takeoff and landing (VTOL) aircraft of a preferred embodiment of the present invention further comprises a main shaft substantially parallel to the longitudinal axis. The aircraft further receives power from an internal combustion engine providing torque to the main shaft. Further included is a higher ratio gear assembly coupling a shaft of the internal combustion engine to the main shaft. The aircraft further comprises a forward torque transfer case that transfers shaft power from the main shaft to the first and second forward horizontal shafts. The forward torque transfer case may be more specifically realized as a forward planetary gear assembly. Similarly an after planetary gear assembly of the present invention transfers shaft power from the main shaft to the first and second after horizontal shafts. The after planetary gear assembly is connected to the first and second after horizontal shafts by a plurality of U-joint linkages.

The present invention in a preferred embodiment further comprises a fan cooling radiator thermally connected above the internal combustion engine for providing forced convection heat transfer to the internal combustion engine. The aircraft additionally comprises a supercharger mechanically connected to the internal combustion engine for enhancing the shaft power produced by the internal combustion engine.

In an additional embodiment, the vertical takeoff and landing (VTOL) aircraft of the present invention further comprises an internal combustion engine configured as an electrical power generator; a first forward motor for converting electrical power from the electrical power generator to shaft power for the first forward horizontal shaft; a second forward motor for converting electrical power from the electrical power generator to shaft power for the second forward horizontal shaft; a first after motor for converting electrical power from the electrical power generator to shaft power for the first after horizontal shaft; and a second after motor for converting electrical power from the electrical power generator to shaft power for the second after horizontal shaft.

A preferred aircraft of the present invention further comprises a first forward propulsion unit planetary gear assembly for transferring power from the first forward horizontal shaft to the first forward propulsion unit; a second forward propulsion unit planetary gear assembly for transferring power from the second forward horizontal shaft to the second forward propulsion unit; a first after propulsion unit planetary gear assembly for transferring power from the first after horizontal shaft to the first after propulsion unit; and a second after propulsion unit planetary gear assembly for transferring power from the second after horizontal shaft to the second after propulsion unit. Further, each of the propulsion units comprises: a forward fan unit having one or more fan blades; and a counter rotating rearward fan unit having one or more fan blades to assist in stabilizing the aircraft.

The vertical takeoff and landing (VTOL) aircraft is further characterized wherein each of the propulsion units are encased by a shroud and each of the shrouds comprised of clear polymer material. Further, a particular embodiment of the present invention provides that each of the after propulsion units comprise a rudder attached to a rear end of each of the after propulsion units, the rudder providing directional control of the aircraft. The invention embodiment including a rudder will further comprise a hydraulic cylinder providing power to actuate the rudder; a hydraulic cylinder fairing encasing the hydraulic cylinder; a hydraulic fluid line contained within each of the after structure beams providing fluid pressure to the hydraulic cylinder; and a rudder anchor rod connecting the hydraulic cylinder to the rudder.

The vertical takeoff and landing (VTOL) aircraft of a preferred embodiment further comprises a tilting mechanism for each of the propulsion units, each of the tilting mechanisms comprising: an annular gear having teeth around an annulus; and an electric motor having teeth to engage the annular gear; wherein each of electric motors is connected to each of the first and second, forward and after structure beams, wherein actuating the electric motor causes the electric motor to rotate about the annular gear, wherein the structure beam rotates to provide vertical rotation of each of the propulsion units.

The invention is further characterized wherein each of the first and second, forward and after structure beams define an interior comprising each of the horizontal shafts, each of the shafts having one or more bearings providing structural support while allowing for rotation of the horizontal shafts. Further the invention is characterized wherein each of the first and second, forward and after structure beams define a horizontal plane and wherein each of the propulsion units comprise a horizontal tilting mechanism to allow for horizontal rotation of the propulsion unit. Further the internal combustion engine may include an auxiliary belt for transferring power to auxiliary systems. The fuselage, in a preferred embodiment, is made from carbon-graphite material.

The vertical takeoff and landing aircraft, in a preferred embodiment, additionally a control system having a torque split control switch for splitting torque between first and second, forward and after propulsion units. The split torque control switch is particularly useful for balance during takeoff. More particularly, the torque split control switch comprises: a neutral position wherein a total torque is proportioned 25% between each of first and second, forward and after propulsion units; a 12 o'clock position wherein the total torque is proportioned 70% between the forward propulsion units, and 30% between the after propulsion units; a 6 o'clock position wherein the total torque is proportioned 30% between the forward propulsion units, and 70% between the after propulsion units; a 3 o'clock position wherein the total torque is proportioned 70% between the first propulsion units, and 30% between the second propulsion units; and a 9 o'clock position wherein the total torque is proportioned 30% between the first propulsion units, and 70% between the second propulsion units.

The vertical takeoff and landing aircraft (VTOL) of the present invention optionally comprises a hinged air brake connected approximately at a mid-section of a side of the fuselage, the hinged air brake having deployed and stowed positions. Alternatively, a hinged air brake is connected underneath the fuselage, the hinged air brake having deployed and stowed positions. Left and right wing control surfaces are also optionally included extending outwardly from the fuselage, the left and right wing sections generally in the shape of an airfoil and tiltable.

The present invention is also a propulsion unit for an aircraft rotatable vertically about a horizontal axis, the propulsion unit comprising: a tilting mechanism connected to the propulsion unit including: an annular gear having teeth around an annulus; and an electric motor having teeth to engage the annular gear, the electric motor rotatable about the annular gear, wherein the electric motor is mechanically connected to the propulsion unit. The propulsion unit of the invention may be further characterized wherein the electric motor is structurally connected to an annular ring for rotating the annular ring, the annular ring connected to a hollow structure beam further connected to the propulsion unit for rotating the propulsion unit about the horizontal axis.

The propulsion unit of a preferred embodiment of the present invention further comprises: a forward fan unit having one or more fan blades; and a counter rotating rearward fan unit having one or more fan blades to assist in stabilizing the aircraft. Optionally, the propulsion unit further comprises a rudder attached to a rear end of the propulsion unit, the rudder providing thrust vectoring control. In the invention embodiment including a rudder, the propulsion unit further comprises: a rudder hinge rod aligned vertically with respect to the propulsion unit, wherein the rudder pivots about the rudder hinge rod; a hydraulic cylinder providing power to actuate the rudder; a hydraulic cylinder fairing encasing the hydraulic cylinder; a hydraulic fluid line contained within a hollow structure beam providing fluid pressure to the hydraulic cylinder; and a rudder anchor rod connecting the hydraulic cylinder to the rudder. Further, the propulsion unit may be shrouded.

In another aspect, the invention is a propulsion unit for an aircraft, rotatable horizontally about a vertical axis, the propulsion unit comprising: a fan unit connected to a horizontal structure beam rotatable horizontally about a vertical pin; and a hydraulic cylinder and anchor rod assembly connected between the horizontal structure beam and the fan unit for providing horizontal rotational movement of the propulsion unit about the vertical axis.

The propulsion unit similarly comprises a shroud partially encasing the fan unit while also allowing for horizontal tilt. The horizontal structure beam of a preferred propulsion unit, has a hollow center portion, and wherein the hollow center portion comprises a shaft providing shaft power to the fan unit. The propulsion unit further comprises a planetary gear assembly for transferring power from the shaft to the fan unit.

The present invention is further configured to include a remote controlled (RC) aircraft comprising: an elongated fuselage portion defining a longitudinal axis; left and right wing sections extending outwardly from the fuselage, the left and right wing sections generally in the shape of an airfoil; a plurality of propulsion units connected to the left and right wing sections wherein the plurality of propulsion units receive power from a single internal combustion engine; and plurality of planetary gear assemblies wherein the single internal combustion engine provides shaft power to a main shaft and wherein the plurality of planetary gears split the shaft power to the plurality of propulsion units.

The remote controlled (RC) aircraft of a preferred embodiment of the present invention, further comprises a plurality of secondary shafts coupled to the main shaft, the secondary shafts contained within the left and right wing sections.

While the apparatus and method has or will be described for the sake of grammatical fluidity with functional explanations, it is to be expressly understood that the claims, unless expressly formulated under 35 USC §112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC §112 are to be accorded full statutory equivalents under 35 USC §112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is an isometric view of a first preferred VTOL aircraft of the present invention;

FIG. 2A is an isometric view of the preferred VTOL aircraft illustrating internal structural components;

FIG. 2B is a sketch of a preferred material construction of a bulkhead of the present invention;

FIG. 2C is a cross-sectional view of a horizontal shaft illustrating an exemplary shaft bearing of the present invention;

DETAILED DESCRIPTION OF THE PREFERRED EMBODIMENTS

Figure 3:
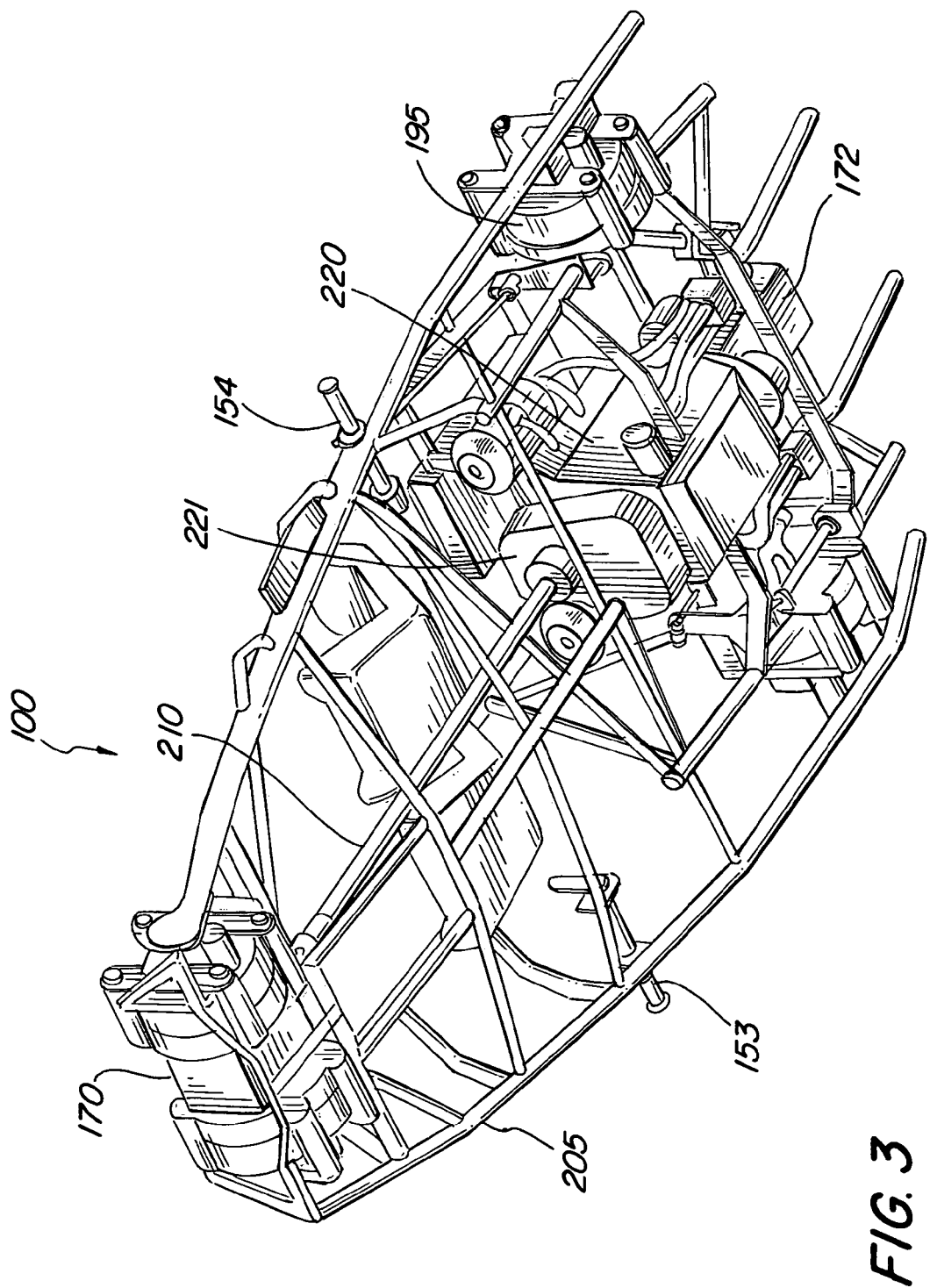
FIG. 3 is a bottom aspect isometric view of the preferred VTOL aircraft illustrating internal mechanical and structural features.

Referring initially to FIG. 1, a first preferred embodiment of a VTOL aircraft of the present invention is shown and generally designated 100. In this particular embodiment, an elongated fuselage 110 defines a longitudinal axis 111 and comprises forward 112 and after sections 114. Fuselage 110 has a lower profile than conventional aircraft designs and is generally wide and narrow in shape to provide some lift during horizontal flight. For reference purposes, the forward 112 and after fuselage 114 can be further divided into left and right quarter sections. Therefore, each quarter section has a respective propulsion unit 131, 132, 133, 134. The propulsion units 131, 132, 133, 134 extend outwardly from the fuselage 110 by first and second, forward and after structure beams 121, 122, 123, 124. As illustrated, propulsion units, 131 for example, are rotatable vertically 142 about a horizontal axis 141. A cockpit area of the aircraft 100 is further illustrated having a windshield and windshield wiper blades 164. Additional disclosure on the cockpit area configuration is provided in FIGS. 11A and 11B.

Referring further to FIG. 2A, an isometric view of the preferred VTOL aircraft 100 Illustrating internal structural components is shown. Fuselage 110 skin covering has been removed for illustrative purposes in FIG. 2A. For stability, the propulsion units, 134 for example, have forward and after counter rotating fan units 236, 238, each providing thrust for the aircraft 100. In a preferred embodiment, aircraft 100 has wing control surfaces 151, 152 that are tiltable, for example 10° up and down. The control surfaces 151, 152 add some maneuverability and controllability and will decrease fuel consumption during horizontal flight as compared to not employing control surfaces 151, 152. Linking arms 153, 154 (FIG. 3) serve to provide tilt capability for control surfaces 151, 152 and can be actuated by hydraulic power, for example. The forward and after landing gear 161, 162 is illustrated in the stowed position. The cockpit area has a head-up display 165 (HUD) further illustrated in FIG. 11A. Further, the cockpit area is separated from the engine compartment by a firewall bulkhead 167. Critical to the lift ability and structural integrity of the aircraft 100, the most advanced lightweight, high strength materials are employed in constructing the aircraft such as composite materials, carbon-graphite, graphite-epoxy and fiberglass. Bulkhead 167, for example, comprises a sandwich construction with honeycomb core 168 and opposing face sheets 169 as illustrated in FIG. 2B.

FIG. 2C illustrates a cross-sectional view of a second after structure beam 124 illustrating an exemplary shaft bearing 266 of the present invention. Inner horizontal shaft 214 is employed to drive the propulsion units, 134 for example. Bearings, 266 for example, will be employed in various points to support drive shafts 211, 212, 213, 214 (FIG. 8) within hollow beams 121, 122, 123, 124 for structural support and to reduce bending stresses during flight.

FIG. 3 shows a bottom aspect view of the preferred VTOL aircraft 100 illustrating internal mechanical and structural features. Portions of power train 200 (FIG. 8) can be seen in FIG. 3 including a piston-powered internal combustion engine 220, higher ratio gear assembly 221 and main shaft 210. The first preferred embodiment 100 employs forward and after torque transfer cases 170, 172 to split torque from main shaft 220 to the propulsion units 131, 132, 133, 134, via horizontal shafts 211, 212, 213, 214. The torque transfer cases 170, 172 are more specifically realized as forward and after planetary gear assemblies 170, 172. Frame 205 of aircraft 100 is further comprised of advanced, lightweight, high-strength materials such as composites to provide optimum power-to-weight ratio that will allow aircraft 100 to take-off and land vertically. A rotating annulus 195 providing vertical tilt is further illustrated in FIG. 8.

Figure 4:
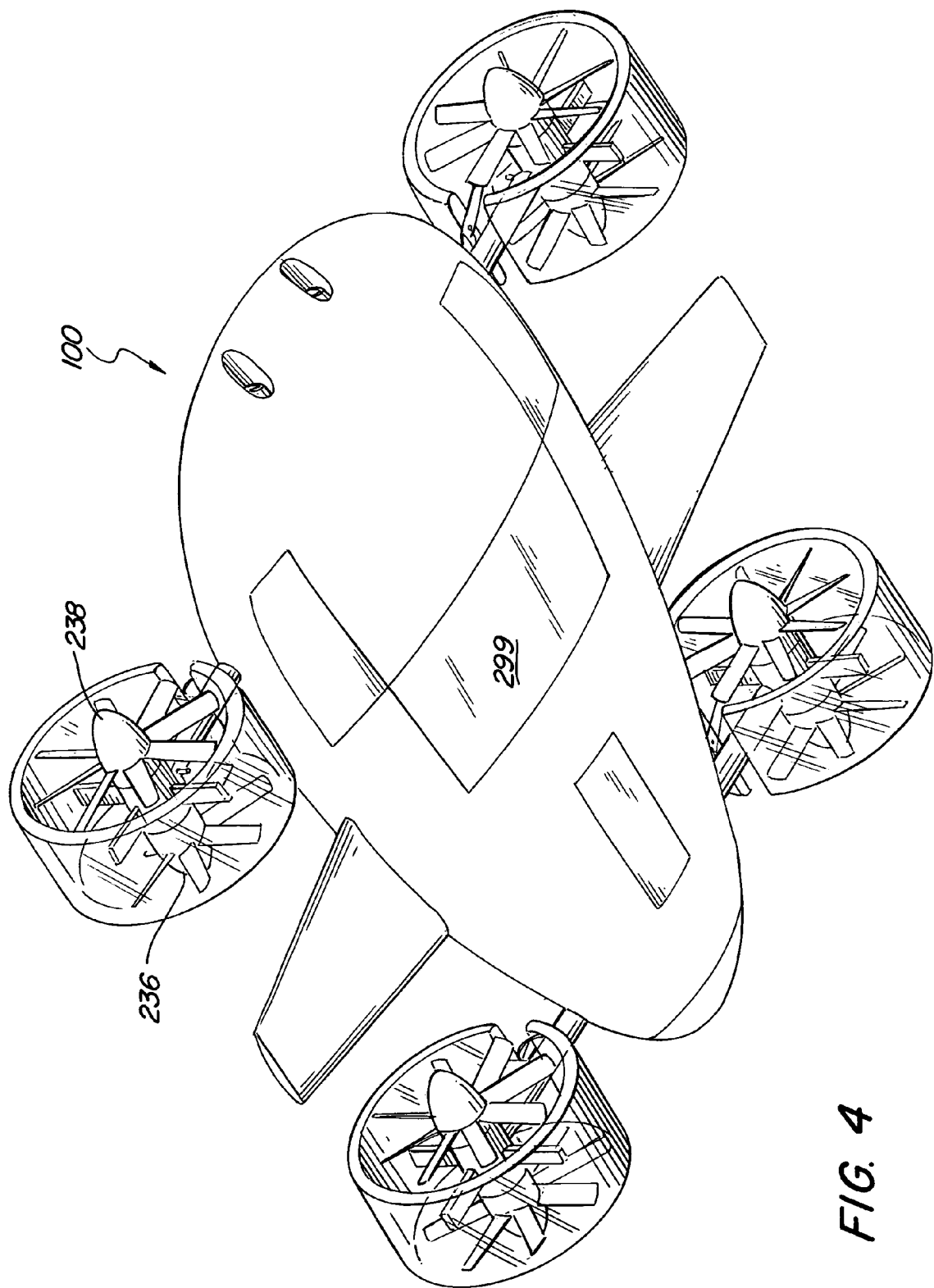
FIG. 4 is a bottom aspect isometric view of the VTOL the preferred aircraft illustrating exterior features.
Figure 5B:
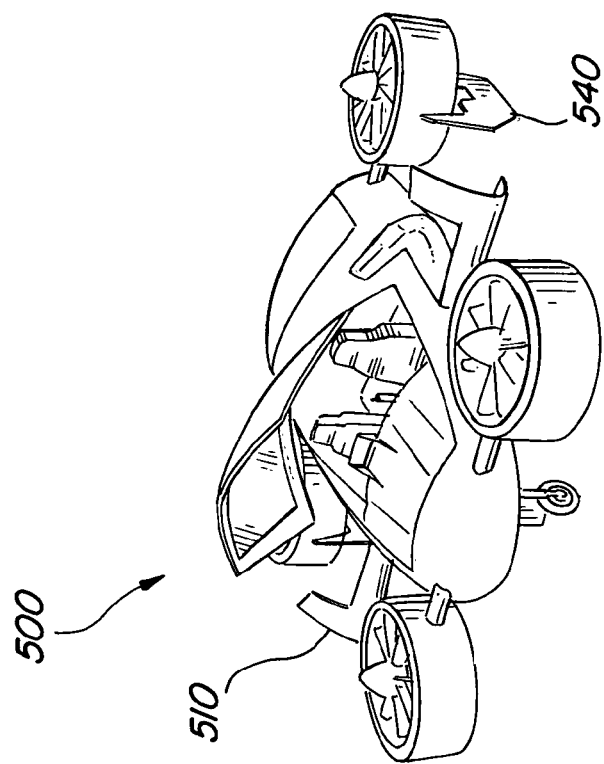
FIGS. 5A and 5B illustrate a second preferred embodiment of the present invention in flight and landed modes.
Figure 5A:
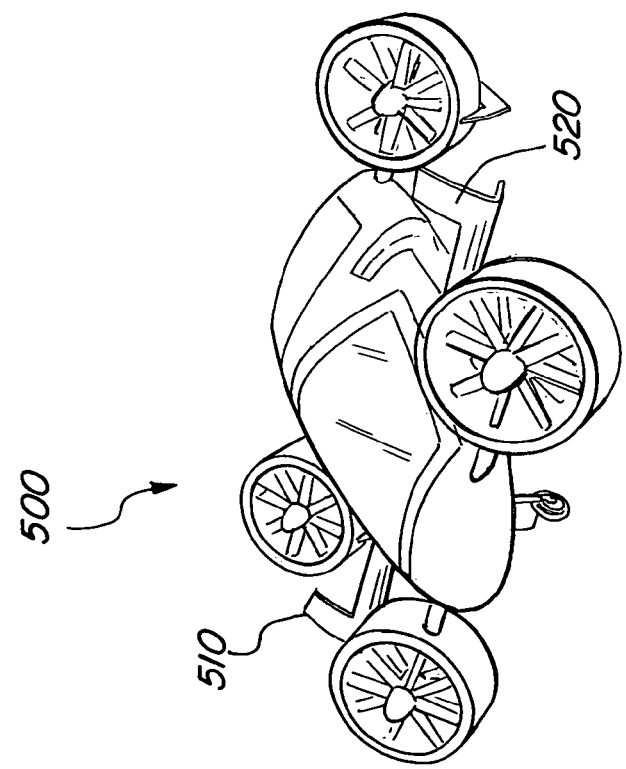

FIG. 4 illustrates a bottom aspect isometric view of the preferred VTOL aircraft 100 illustrating exterior features. Airbrake 299 has deployed and stowed positions and is being illustrated in its stowed position. FIGS. 5A and 5B illustrate a second preferred embodiment 500 of the present invention in flight and landed modes, respectively. This embodiment 500 employs airbrakes 510, 520 on right and left sides of the aircraft 500 and does not included control surfaces 151, 152. FIG. 5B also shows landed aircraft 500 having rudders 540 (FIGS. 7A and 7B) that vector thrust or impart a moment on the aircraft 500 and provide directional control of the aircraft 500 during flight.

Figure 6:
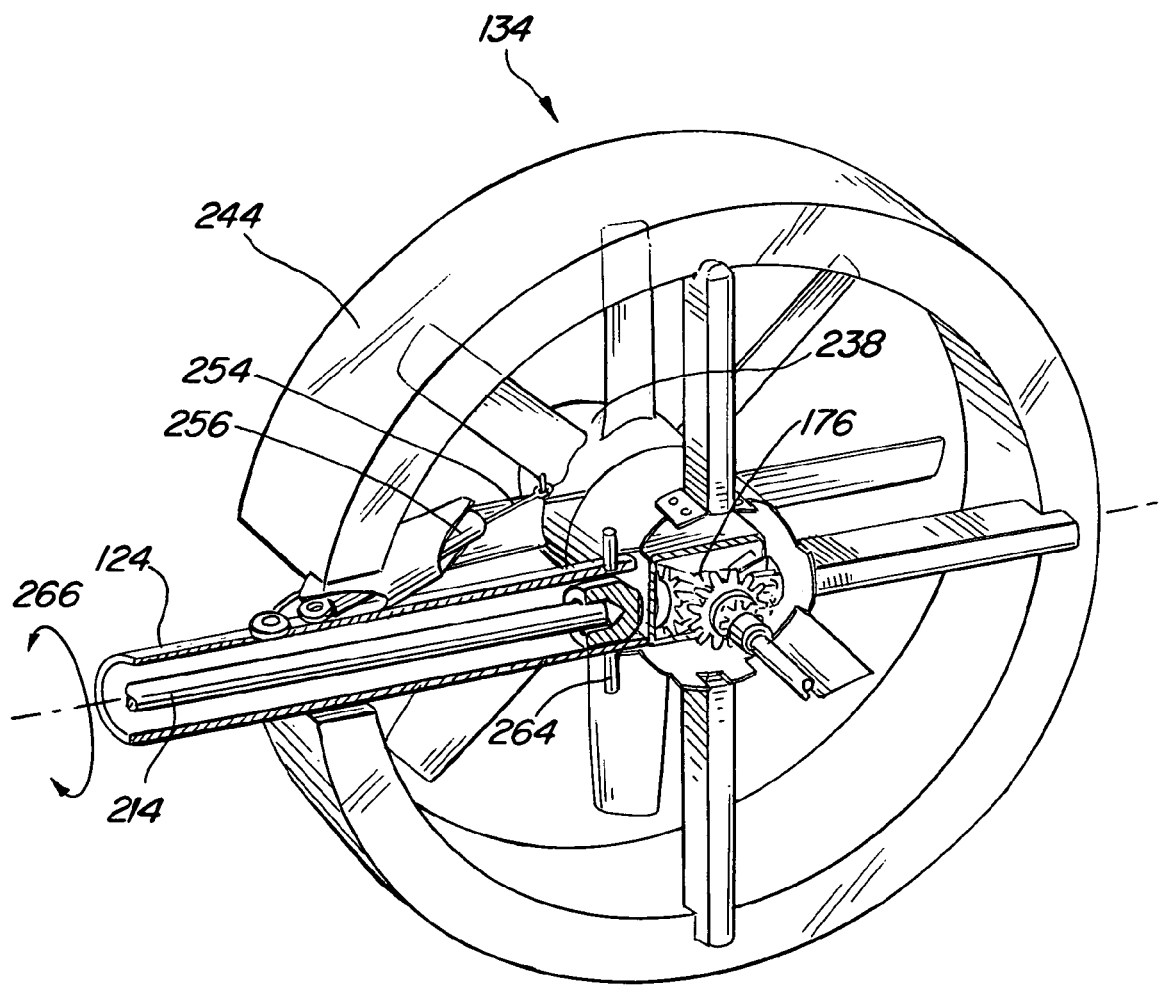
FIG. 6 is an isometric sectional view of a propulsion unit of the present invention as viewed along sectional line 6-6 of the present invention.

Referring to FIG. 6 a perspective view of a first preferred propulsion unit 134 has been sectioned along line 6-6 of and is illustrated in FIG. 1. Initially, shaft power is transferred from horizontal shaft 214 to forward (not shown) 236 and rear fan units 238, via planetary gear assembly 176. Shaft 214 may be structurally supported within the hollow structure beam 124 by one or more radial bearings (not shown) as previously described. Also as stated herein, propulsion unit 134 is able to rotate about a horizontal axis (141 in FIG. 1 for example) to provide VTOL capabilities. Accordingly, structure beam 124 is rotatable about horizontal shaft 214 to rotate propulsion unit 134, and therefore, aircraft 100 is a "tilt-fan" type. In this preferred embodiment, structure beams 121, 122, 123, 124 define a horizontal plane of aircraft 100, and propulsion unit 134 is additionally tiltable horizontally 266 about pin 264 providing directional control of aircraft 100. Providing horizontal tilt capability 266 is an alternative to providing a rudder 540 as illustrated in FIGS. 5A, 5B, 7A, and 7B. The propulsion unit 134 is optionally shrouded 244 according to the particular standards and wishes of the design. For example, shroud 244 may improve aural signature but may introduce unwanted drag. Also, FAA federal agency requirements may require a particular standard for ducted fans, for aural signature and safety. Additionally, shroud 244 should be comprised of high strength clear plastic or reinforced clear epoxy glass to facilitate pilot view, particularly the forward shrouds also illustrated herein. Further, it can be seen that shroud 244 will not encompass a full annulus to allow for horizontal tilt movement 266.

Figure 7A:
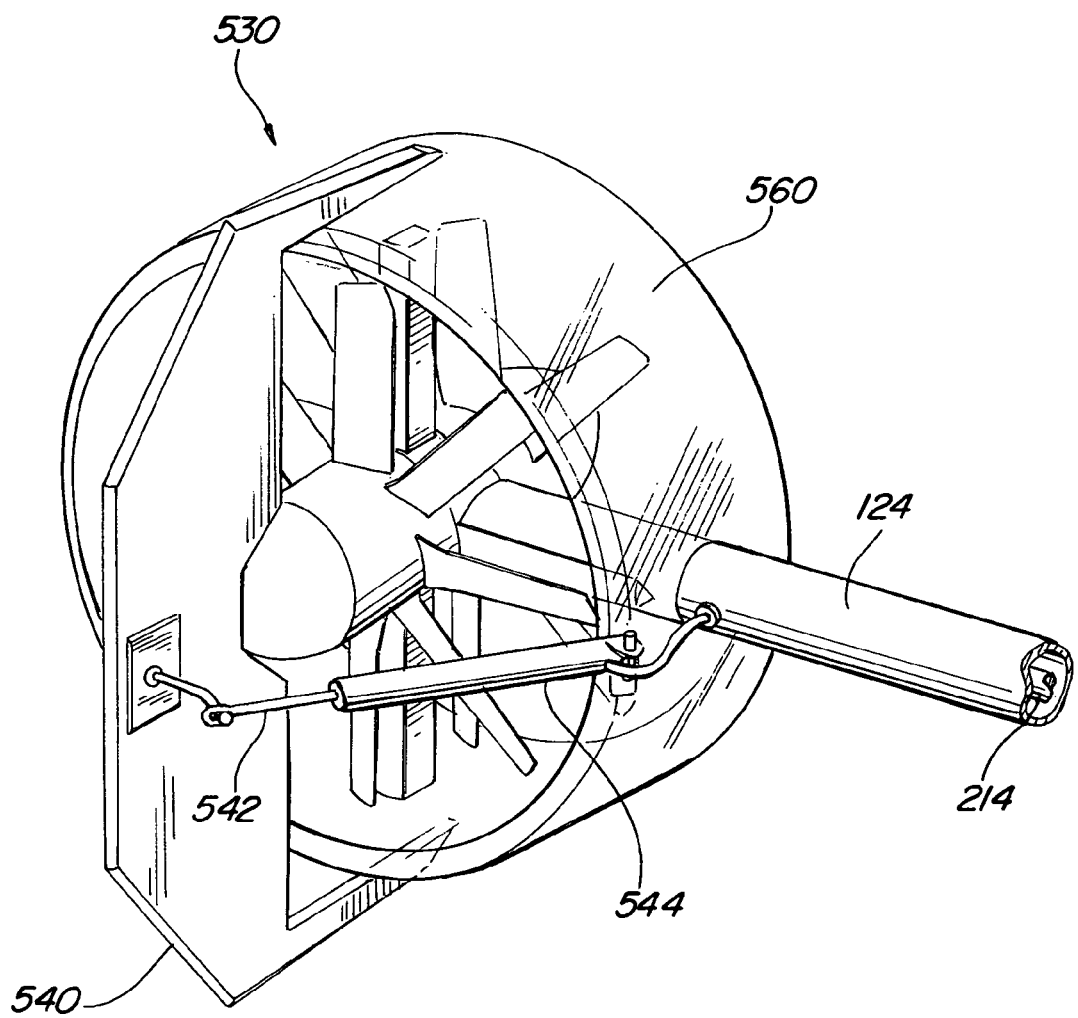
FIGS. 7A and 7B illustrate isometric views of a rudder embodiment of the present invention.
Figure 7B:
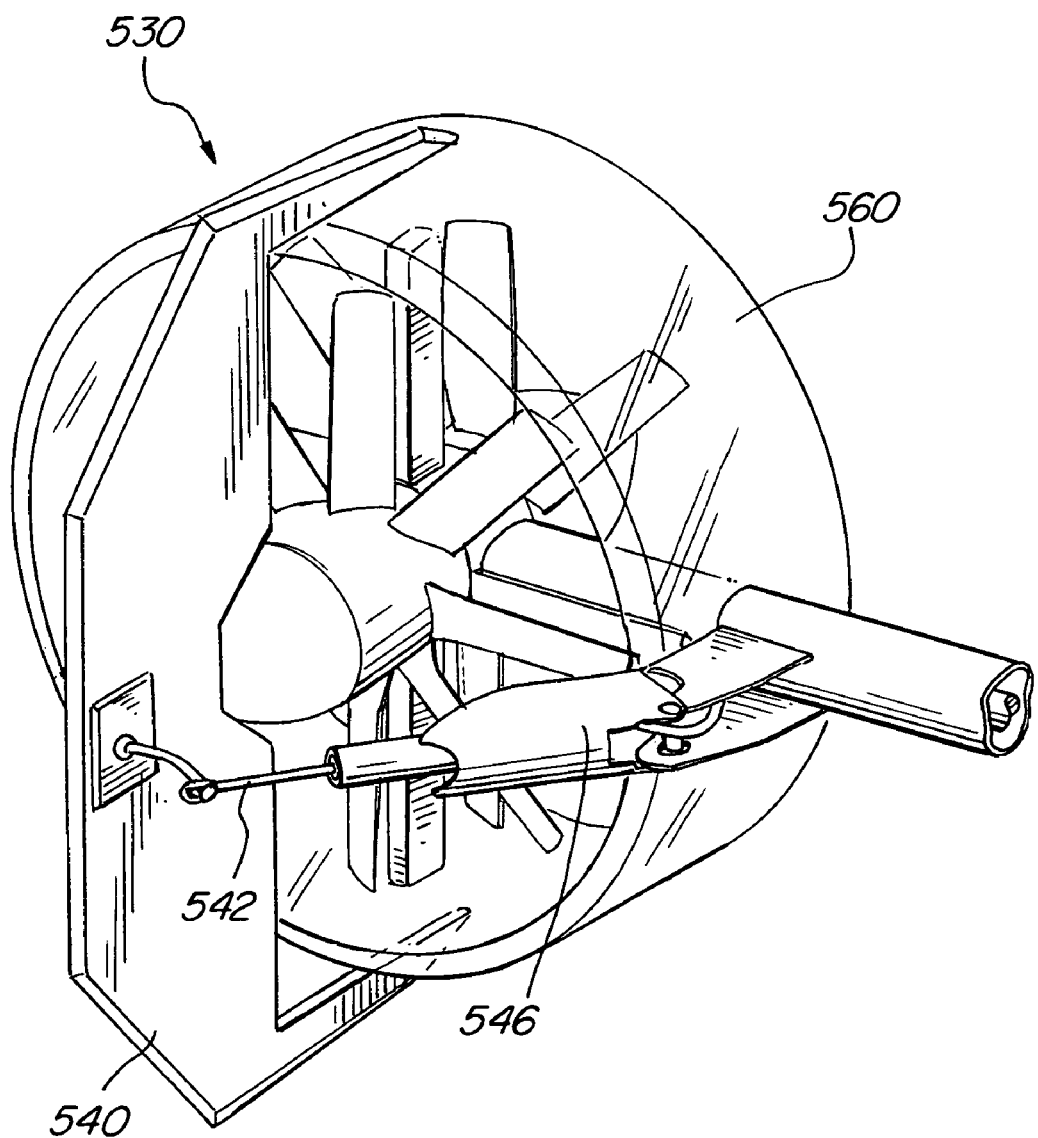

Referring now to FIGS. 7A and 7B, propulsion unit 530 differs from propulsion unit 134 in that a rudder 540 is employed for thrust vectoring in lieu of providing horizontal tilt capability 266. In a preferred embodiment, a hydraulic cylinder 544 and anchor rod 542 arrangement is used to provide rudder control as illustrated in FIG. 7A. Fairing 546 is added in FIG. 7B for aerodynamic considerations and for physical protection of components. In this embodiment of propulsion unit 530, clear shroud 560 is able to form a full annulus since it does not have to allow for horizontal tilt 266.

Figure 8:
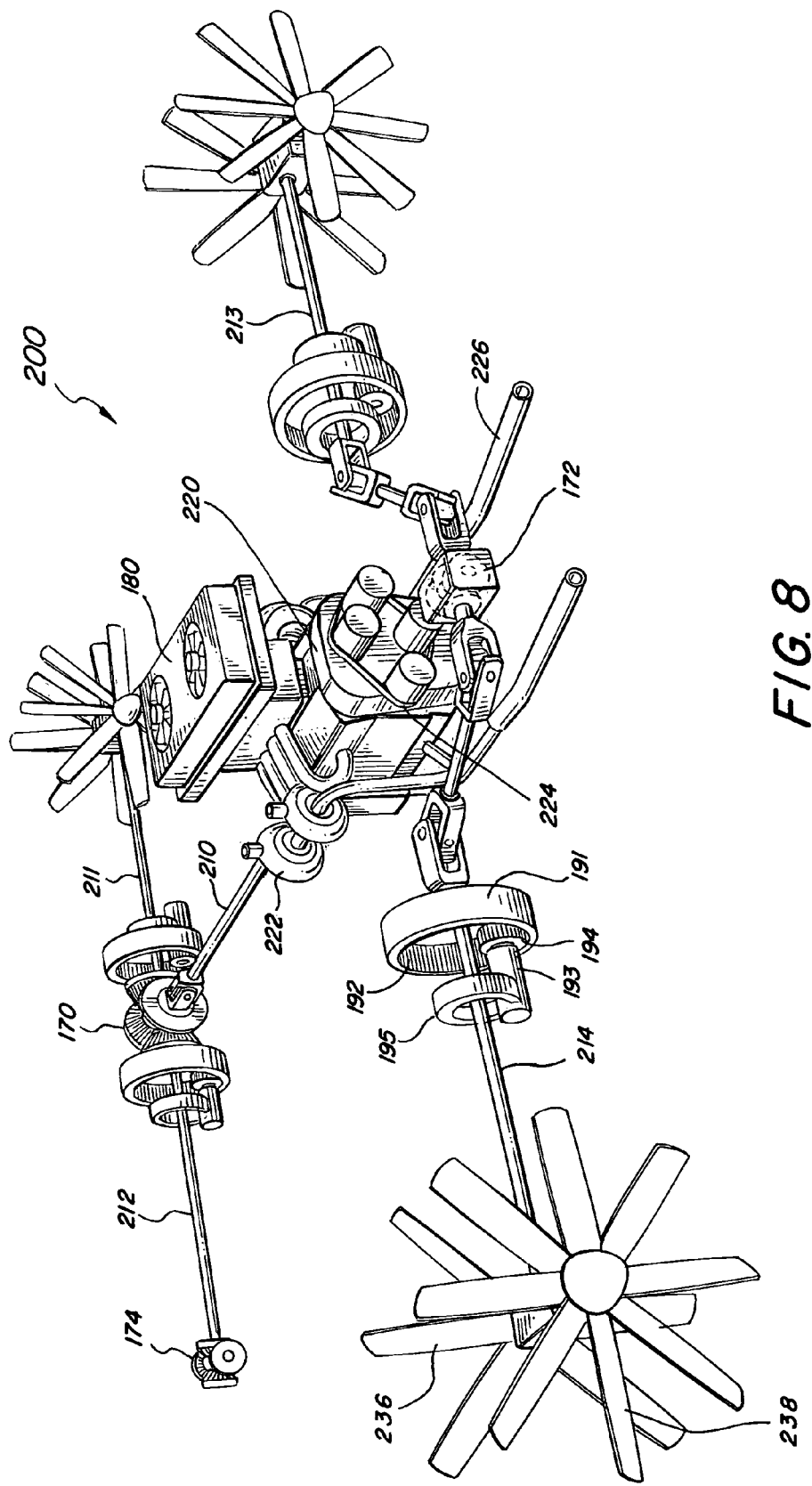
FIG. 8 is a perspective illustration of a preferred power train of the present invention.

A power train 200 of a VTOL aircraft of the present invention is illustrated in FIG. 8. Work is produced by engine 220 that is generally piston powered or an internal combustion engine that will exhaust combustion products through manifold 226 and provide work output to main shaft 210 while also providing output to a rear shaft (not shown) coupled to after planetary gear assembly 172. It is to be appreciated that the engine could comprise a turbine or jet engine configured with appropriate gears to rotate a shaft. Further referring to FIG. 8, main shaft 210 is coupled to forward planetary gear assembly 170, which transfers torque to first and second forward horizontal shafts 211, 212. Further, forward horizontal shafts 211, 212 will transfer shaft power to forward propulsion units 131, 132, respectively, via first 174 and second (not shown) forward propulsion unit planetary gear assemblies. After planetary gear assembly 172 transfers shaft power to the after propulsion units 133, 134, but however employs a plurality of U-joint linkages 227 for effectively articulating after shafts 213, 214. Engine 180 comprises a twin turbo unit or supercharger 222 having supercharging capability to offset the effect of reduced intake air pressure due to altitude. Furthermore, engine 180 is designed with latest advancements in engine technology to provide maximum horsepower while not adding significant weight and should be fueled by high-octane gasoline. It is further contemplated that an advanced 8 to 12 cylinder automobile engine weighing 600 lbs. or less, will be adequate to perform in this capacity. For example, existing automobile engine technology can produce a 600 horsepower engine without a turbo unit or supercharger. An exemplary design payload is approximately in the range of 600-900 lbs. A greater horsepower design may improve operational performance while not adding significantly more weight or being further being constrained by fuel tank requirements. It is also contemplated that engine 220 is liquid cooled rather than air cooled via cooling unit 180. Engine 220 will be required to operate at high RPM, for example, approximately 75% to 85% of maximum during take-off and landing. The heat generated during this operation will need to be removed by cooling unit 180. Power for auxiliary systems may be provided via belt drive 224.

Additionally referring to FIG. 8, a tilting mechanism of a preferred embodiment of the present invention generally comprises an annular gear 191 having teeth 192 around an annulus and an electric motor 193 having teeth 194 to engage the annular gear. Motor 193 may be powered and controlled electrically, or by any other suitable means known in the art, and is physically connected to a structure beam (124, for example FIG. 6) via an annulus, 195 for example. When electric motor 193 is actuated by electrical current, motor 193 rotates providing vertical tilt capability of the present invention. In this way, the aircraft 100 is said to be "fly-by-wire" controlled and further could be automatically controlled by programmable electronics.

Figure 9B:
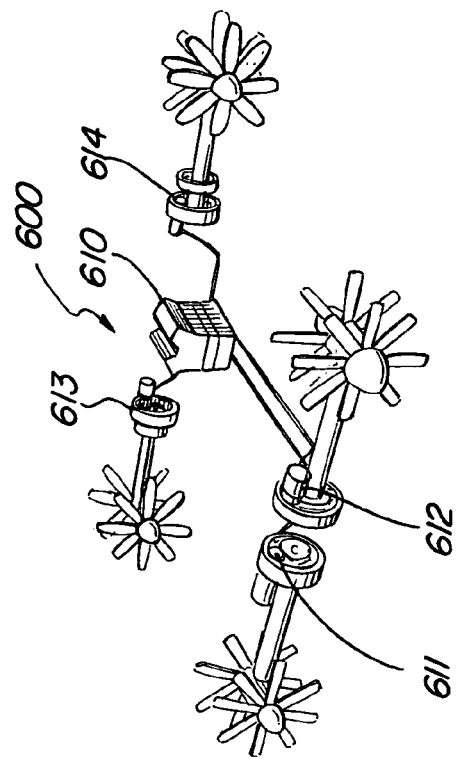
FIGS. 9A and 9B are additional illustrations of preferred power trains of the present invention.
Figure 9A:
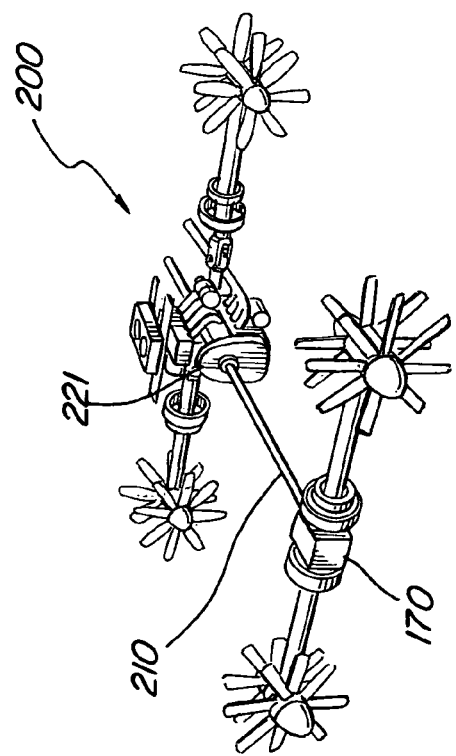

FIG. 9A is an additional illustration of power train 200, generally as viewed from a forward position and FIG. 9B illustrates an alternative power train 600 of the present invention. Power train 600 instead employs four electric motors 611, 612, 613, 614 providing shaft horsepower, the motors 611, 612, 613, 614 receive electrical power from power generator 610. It is contemplated that generator 610 will require relatively high electrical output requirements without adding significant size and weight, and the required shaft horsepower may require three-phase electrical power with single-phase or three-phase motors. This embodiment 600 may be referred to as a "hybrid configuration."

Figure 10B:
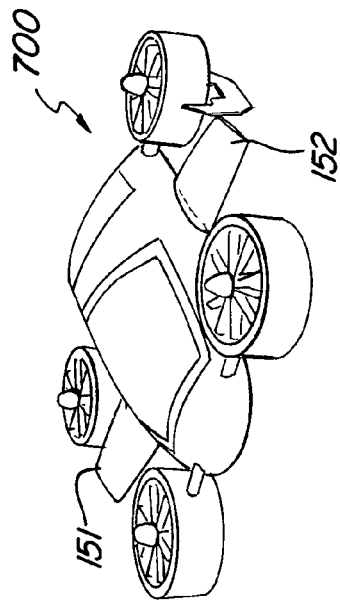
FIGS. 10A through 10H illustrate the first preferred VTOL aircraft in various operational modes.
Figure 10A:
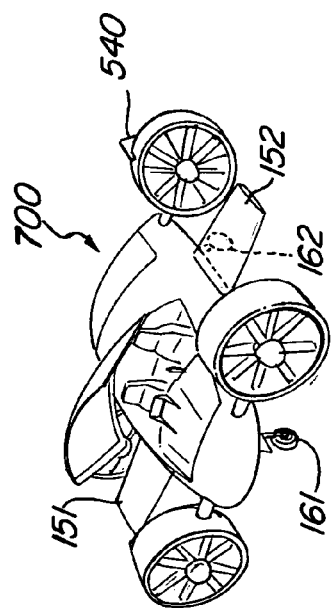
Figure 10D:
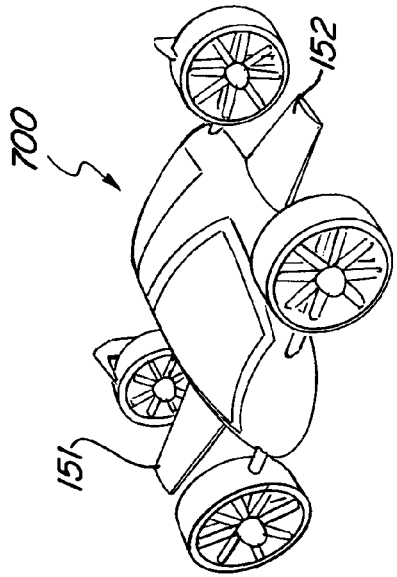

FIGS. 10A through 10H illustrate a preferred VTOL aircraft 700 in various operational modes. This particular embodiment 700 has control surfaces 151, 152 and rudders, 540 for example, for directional control. FIG. 10A shows aircraft 700 in park with landing gear 161, 162 deployed. FIG. 10B shows aircraft 700 in vertical take-off mode having tilt fan capability. Similar to the helicopter design, ground effect considerations are taken into account here such as limited ability to operate from a very loose surface such as dust. The aircraft 700 will additionally be designed for proper balance during vertical takeoff. Specifically, engine 220 is generally provided toward the after portion 114 of the fuselage while the payload and fuel will be weighted more toward the center of the aircraft 700 providing a center of gravity that is slightly aft of a geometric center of aircraft 700. After propulsion units 133, 134 could be positioned further to the rear of the aircraft to account for the balance problem. Generally however, providing four propulsion units 131, 132, 133, 134, positioned about a center of the aircraft 700 is ideal to address balance considerations. Additionally, the present invention provides a split torque capability 812, so that engine 220 output can be proportioned differently among the propulsion units 131, 132, 133, 134 as illustrated in FIGS. 11A and 11B. It is further contemplated that precise torque matching for proper balance during vertical takeoff could be predetermined and provided by the present invention.

Figure 10C:
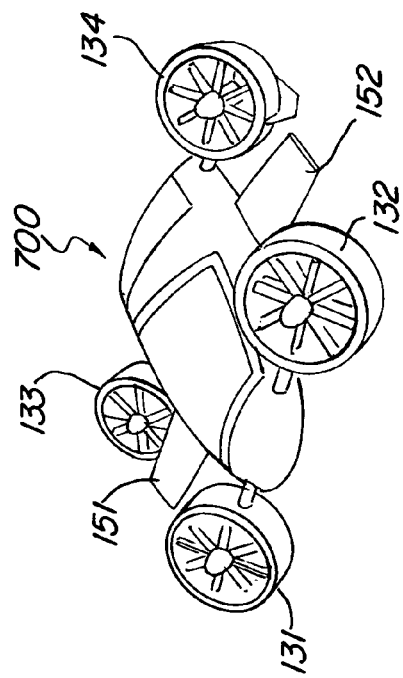
Figure 10E:
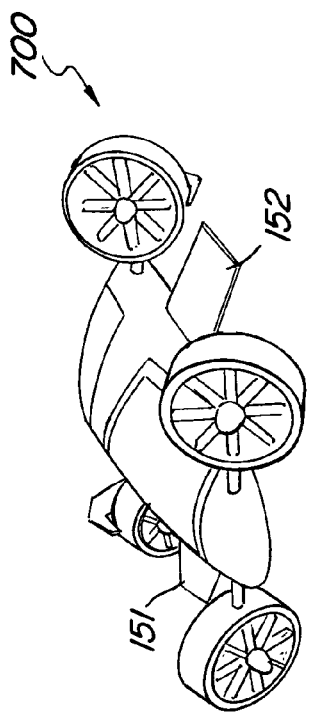
Figure 10F:
Figure 10G:
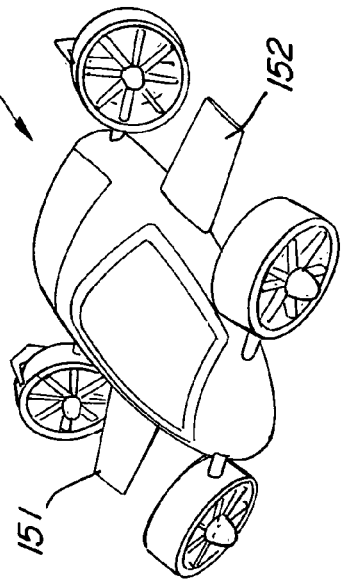
Figure 10H:
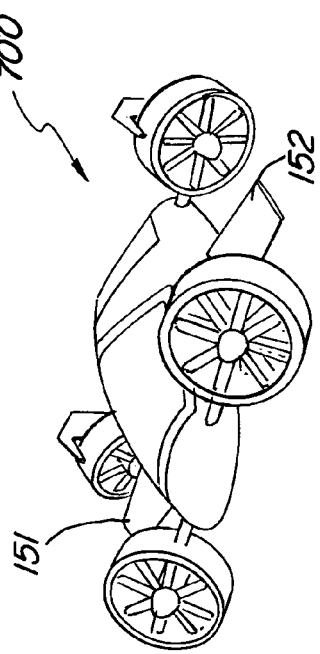
Figure 11A:
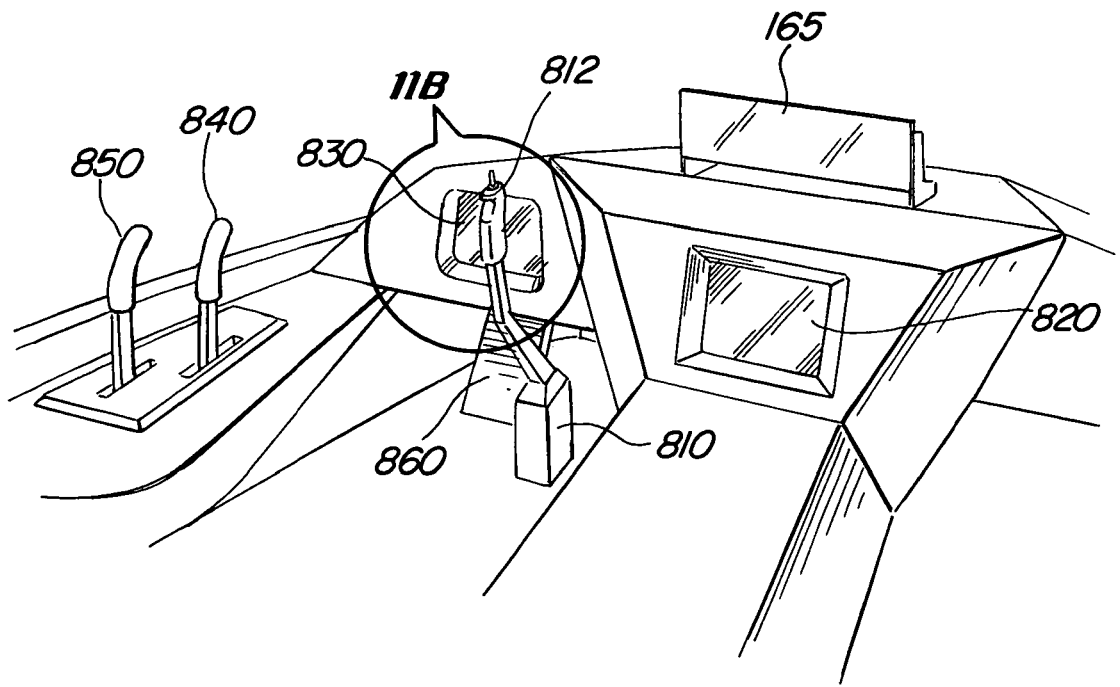
FIGS. 11A and 11B illustrate a preferred cockpit configuration and torque split control switch of the present invention.
Figure 11B:
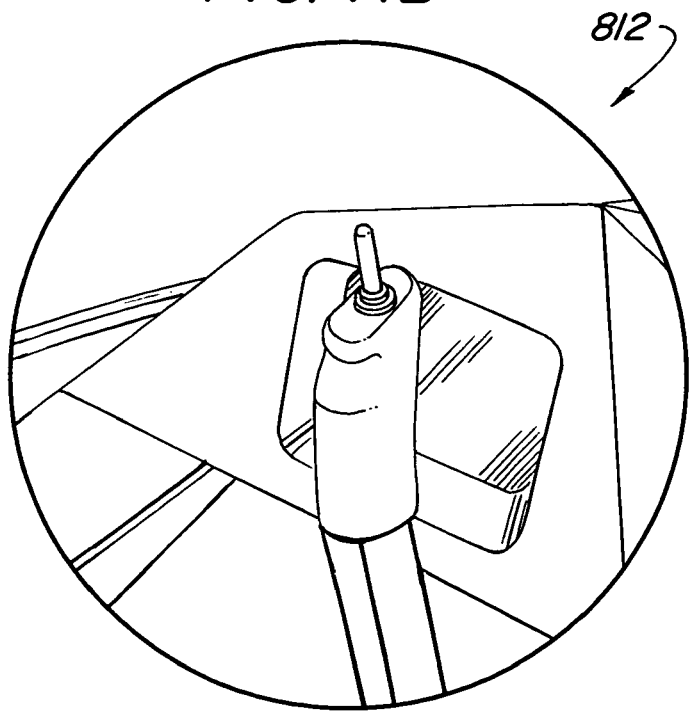

FIG. 10C illustrates aircraft 700 in hovering mode with propulsion units 131, 132, 133, 134, tilted for maintaining altitude in this mode. FIG. 10D illustrates VTOL aircraft 700 in transition flight mode with propulsion units 131, 132, 133, 134 positioned horizontally, or near horizontal. In this mode, the engine 220 RPM requirements are greatly reduced as compared to hovering and vertical takeoff as control surfaces 151, 152 provide lift for aircraft 700. FIGS. 10E and 10F illustrate yaw control as this aircraft 700 employs rudder 540 directional control for after propulsion units 133, 134. Also, it can be seen that different vertical tilts on propulsion units 131, 132, 133, 134, can further provide directional control. Similarly, FIGS. 10G and 10H illustrate ascending and descending flight respectively by tilting propulsion units 131, 132, 133, 134, and changing angle on control surfaces 151, 152.

FIG. 11A illustrates an exemplary cockpit configuration of the present invention. A Head-Up-Display 165 includes typical flight instrumentation that provides analog or digital instrument indications while allowing a pilot to maintain forward-looking view. An additional display 820 is illustrated to provide further instrument indication as needed. In a preferred embodiment, Information Display Screen 830 has a touch screen user interface. Additionally in the exemplary embodiment, control devices 840 and 850 are included for throttle and fan angle control. Main joystick 810 is provided for pilot control also having a torque split control switch 812 more closely illustrated in FIG. 11B. Torque split control switch 812 is specifically unique to the present invention. Switch 812 has a neutral position that is also the center return-default position were shaft output is equally split between forward 131, 132 and after 133, 134 propulsion units 50%/50%. In a preferred embodiment, a 12 o'clock position will split torque 70% forward 131, 132, and 30% aft. Likewise, a 6 o'clock position will split torque 30% forward and 70% aft. To further split power between left and right sides of the aircraft 700, a 9 o'clock position will split torque 70% left 132, 134, and 30% right 131, 133 and similarly a 3 o'clock position will split torque 70% right 131, 133 and 30% to the left side propulsion units 132, 134.

Figure 12A:
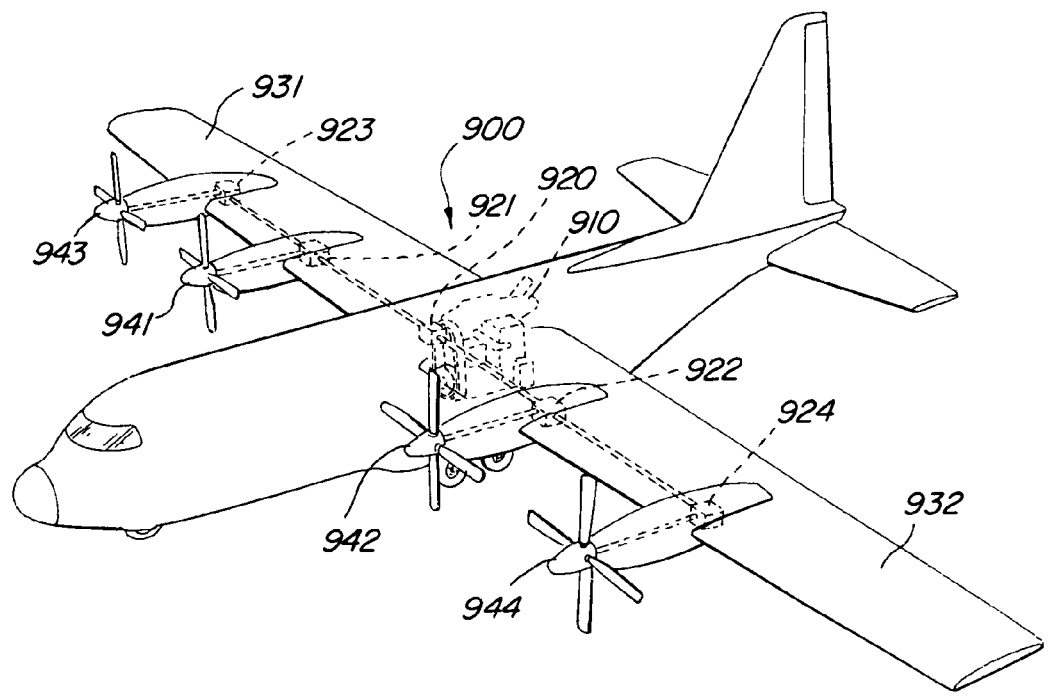
FIG. 12A is a perspective view of a cargo loader embodiment of the present invention.
Figure 12B:
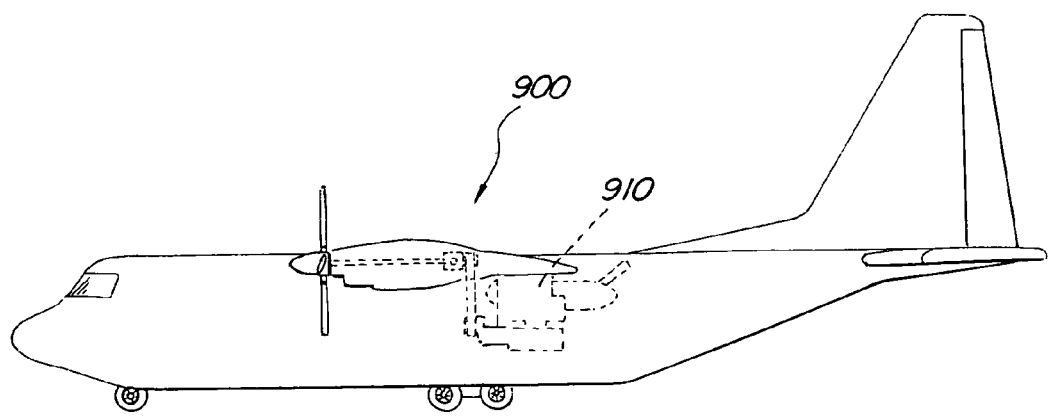
FIG. 12B is a side elevational view of the cargo loader embodiment of the present invention.

FIG. 12A is a perspective view of a cargo loader embodiment 900 of the present invention. In this embodiment, a single engine 910 is employed to power four propellers 941, 942, 943, 944 as shown. According to the present invention, shaft power is transferred via torque transfer cases 920, 921, 922, 923, 924. The right 921, 922 and left 922, 924, torque transfer cases are physically inside of control surfaces 931, 933 in the embodiment shown 900. Aircraft 900 could be realized as a model RC or a full sized aircraft. It will also be appreciated that power generation and torque transfer could be similarly achieved by two engines and four propellers; or one engine and two propellers in addition to various combinations that would save weight over existing designs. The illustrated cargo loader 900 could also be configured as a passenger jet.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular Sky Hopper as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A vertical takeoff and landing (VTOL) aircraft, comprising:

an elongated fuselage having forward and after sections and defining a longitudinal axis, the forward and after sections each having left and right quarter sections;

a first forward structure beam extending outward from the fuselage perpendicular to the longitudinal axis at the forward right quarter section;

a second forward structure beam extending outward from the fuselage perpendicular to the longitudinal axis at the forward left quarter section;

a first after structure beam extending outward from the fuselage perpendicular to the longitudinal axis at the after right quarter section;

a second after structure beam extending outward from the fuselage perpendicular to the longitudinal axis at the after left quarter section;

a first forward propulsion unit structurally connected to the first forward structure beam;

a second forward propulsion unit structurally connected to the second forward structure beam;

a first after propulsion unit structurally connected to the first forward structure beam; and a second after propulsion unit structurally connected to the second after structure beam, wherein each of the propulsion units is rotatable vertically about a horizontal axis relative to the fuselage, and wherein each of the propulsion units is shaft driven and wherein the first and second, forward and after structure beams each comprise a horizontal shaft, and wherein each of the after propulsion units comprise a rudder attached to a rear end of each of the after propulsion units, the rudder providing directional control of the aircraft, the aircraft further comprising:

a hydraulic cylinder providing power to actuate the rudder;

a hydraulic cylinder fairing encasing the hydraulic cylinder;

a hydraulic fluid line contained within each of the after structure beams providing fluid pressure to the hydraulic cylinder; and a rudder anchor rod connecting the hydraulic cylinder to the rudder.

2. The vertical takeoff and landing aircraft (VTOL) of claim 1, wherein the aircraft comprises a control system, the control system comprising a torque split control switch for splitting torque between first and second, forward and after propulsion units.

3. The vertical takeoff and landing aircraft (VTOL) of claim 2, wherein split torque control is provided between forward and after propulsion units for balance during takeoff.

4. The vertical takeoff and landing (VTOL) aircraft of claim 1 further comprising:

a first forward propulsion unit planetary gear assembly for transferring power from the first forward horizontal shaft to the first forward propulsion unit;

a second forward propulsion unit planetary gear assembly for transferring power from the second forward horizontal shaft to the second forward propulsion unit;

a first after propulsion unit planetary gear assembly for transferring power from the first after horizontal shaft to the first after propulsion unit; and a second after propulsion unit planetary gear assembly for transferring power from the second after horizontal shaft to the second after propulsion unit.

5. The vertical takeoff and landing (VTOL) aircraft of claim 1, each of the propulsion units comprising:

a forward fan unit having one or more fan blades; and a counter rotating rearward fan unit having one or more fan blades to assist in stabilizing the aircraft.

6. The vertical takeoff and landing (VTOL) aircraft of claim 1, wherein each of the propulsion units are encased by a shroud, each of the shrouds comprised of clear polymer material.

7. A vertical takeoff and landing (VTOL) aircraft, comprising:

an elongated fuselage having forward and after sections and defining a longitudinal axis, the forward and after sections each having left and right quarter sections;

a first forward structure beam extending outward from the fuselage perpendicular to the longitudinal axis at the forward right quarter section;

a second forward structure beam extending outward from the fuselage perpendicular to the longitudinal axis at the forward left quarter section;

a first after structure beam extending outward from the fuselage perpendicular to the longitudinal axis at the after right quarter section;

a second after structure beam extending outward from the fuselage perpendicular to the longitudinal axis at the after left quarter section;

a first forward propulsion unit structurally connected to the first forward structure beam;

a second forward propulsion unit structurally connected to the second forward structure beam;

a first after propulsion unit structurally connected to the first forward structure beam; and a second after propulsion unit structurally connected to the second after structure beam, wherein each of the propulsion units is rotatable vertically about a horizontal axis relative to the fuselage, and wherein each of the propulsion units is shaft driven and wherein the first and second, forward and after structure beams each comprise a horizontal shaft, the aircraft further comprising:

a main shaft substantially parallel to the longitudinal axis; and a forward torque transfer case that transfers shaft power from the main shaft to the first and second forward horizontal shafts, wherein the forward torque transfer case comprises a forward planetary gear assembly, the aircraft further comprising a plurality of U-joint linkages for connecting the after planetary gear assembly to the first and second after horizontal shafts, wherein each of the after propulsion units comprise a rudder attached to a rear end of each of the after propulsion units, the rudder providing directional control of the aircraft.

8. A vertical takeoff and landing aircraft (VTOL), comprising:

an elongated fuselage having forward and after sections and defining a longitudinal axis, the forward and after sections each having left and right quarter sections;

a first forward structure beam extending outward from the fuselage perpendicular to the longitudinal axis at the forward right quarter section;

a second forward structure beam extending outward from the fuselage perpendicular to the longitudinal axis at the forward left quarter section;

a first after structure beam extending outward from the fuselage perpendicular to the longitudinal axis at the after right quarter section;

a second after structure beam extending outward from the fuselage perpendicular to the longitudinal axis at the after left quarter section;

a first forward propulsion unit structurally connected to the first forward structure beam;

a second forward propulsion unit structurally connected to the second forward structure beam;

a first after propulsion unit structurally connected to the first forward structure beam; and a second after propulsion unit structurally connected to the second after structure beam;

wherein each of the propulsion units is rotatable vertically about a horizontal axis relative to the fuselage, and wherein each of the propulsion units is shaft driven and wherein the first and second, forward and after structure beams each comprise a horizontal shaft, wherein the aircraft further comprises a control system, the control system comprising a torque split control switch for splitting torque between first and second, forward and after propulsion units, wherein the torque split control switch comprises:
- a neutral position wherein a total torque is proportioned 25% between each of first and second, forward and after propulsion units;
- a 12 o'clock position wherein the total torque is proportioned 70% between the forward propulsion units, and 30% between the after propulsion units;
- a 6 o'clock position wherein the total torque is proportioned 30% between the forward propulsion units, and 70% between the after propulsion units;
- a 3 o'clock position wherein the total torque is proportioned 70% between the first propulsion units, and 30% between the second propulsion units; and
- a 9 o'clock position wherein the total torque is proportioned 30% between the first propulsion units, and 70% between the second propulsion units.

9. A vertical takeoff and landing (VTOL) aircraft, comprising:
- an elongated fuselage having forward and after sections and defining a longitudinal axis, the forward and after sections each having left and right quarter sections;
- a first forward structure beam extending outward from the fuselage perpendicular to the longitudinal axis at the forward right quarter section;
- a second forward structure beam extending outward from the fuselage perpendicular to the longitudinal axis at the forward left quarter section;
- a first after structure beam extending outward from the fuselage perpendicular to the longitudinal axis at the after right quarter section;
- a second after structure beam extending outward from the fuselage perpendicular to the longitudinal axis at the after left quarter section;
- a first forward propulsion unit structurally connected to the first forward structure beam;
- a second forward propulsion unit structurally connected to the second forward structure beam;
- a first after propulsion unit structurally connected to the first forward structure beam; and
- a second after propulsion unit structurally connected to the second after structure beam;

wherein each of the propulsion units is rotatable vertically about a horizontal axis relative to the fuselage, and wherein each of the propulsion units is shaft driven and wherein the first and second, forward and after structure beams each comprise a horizontal shaft, the aircraft further comprising a tilting mechanism for each of the propulsion units, each of the tilting mechanisms comprising:
- an annular gear having teeth around an annulus; and
- an electric motor having teeth to engage the annular gear;
- wherein each of electric motors is connected to each of the first and second, forward and after structure beams, wherein actuating the electric motor causes the electric motor to rotate about the annular gear, wherein the structure beam rotates to provide vertical rotation of each of the propulsion units.

10. The vertical takeoff and landing (VTOL) aircraft of claim 9, wherein the first and second, forward and after structure beams define a horizontal plane and wherein each of the propulsion units comprises a horizontal tilting mechanism to allow for horizontal rotation of the propulsion unit.

11. The vertical takeoff and landing aircraft (VTOL) of claim 9, further comprising a hinged air brake connected approximately at a mid-section of a side of the fuselage, the hinged air brake having deployed and stowed positions, wherein the deployed positions are backwardly inclined.

12. The vertical takeoff and landing aircraft (VTOL) of claim 9, further comprising a hinged air brake connected underneath the fuselage, the hinged air brake having deployed and stowed positions, wherein the deployed positions are backwardly inclined.

13. The vertical takeoff and landing aircraft (VTOL) of claim 9, further comprising left and right wing control surfaces extending outwardly from the fuselage, the left and right wing sections generally in the shape of an airfoil and tiltable.

14. A remote controlled (RC) aircraft, comprising:
- an elongated fuselage portion defining a longitudinal axis;
- left and right wing sections extending outwardly from the fuselage, the left and right wing sections generally having a shape of an airfoil;
- a plurality of propulsion units connected to the left and right wing sections wherein the plurality of propulsion units are configured to receive power from a single internal combustion engine;
- a plurality of planetary gear assemblies wherein the single internal combustion engine provides shaft power to a main shaft and wherein the plurality of planetary gears split the shaft power to the plurality of propulsion units, and
- a tilting mechanism for each of the propulsion units, each of the tilting mechanisms comprising:
  - an annular gear having teeth around an annulus; and
  - an electric motor having teeth to engage the annular gear;
  - wherein each of electric motors is connected to each of the first and second, forward and after structure beams, wherein actuating the electric motor causes the electric motor to rotate about the annular gear, wherein the structure beam rotates to provide vertical rotation of each of the propulsion units.

15. The remote controlled (RC) aircraft of claim 14, further comprising a plurality of secondary shafts coupled to the main shaft, the secondary shafts being contained within the left and right wing sections.

* * * * *